Patented Oct. 17, 1939

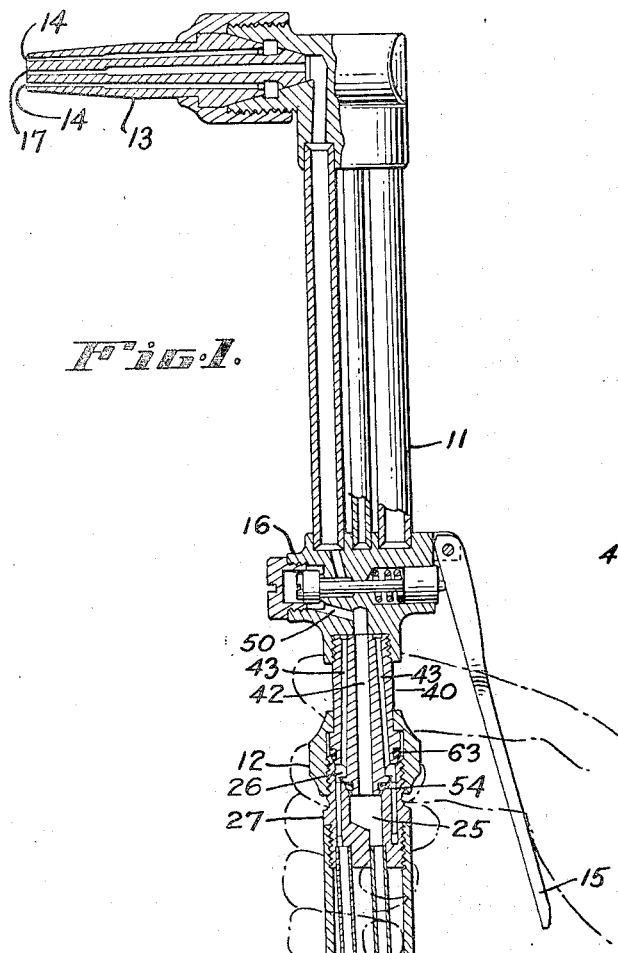
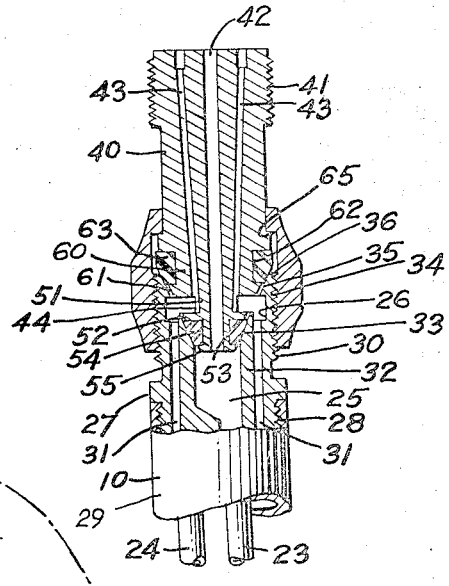
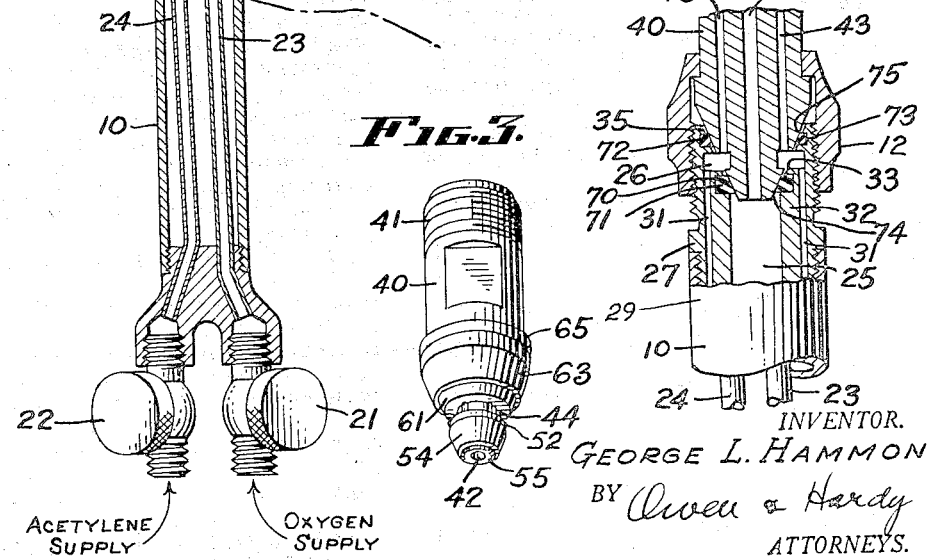

2,176,813

UNITED STATES PATENT OFFICE 2,176,813

WELDING IMPLEMENT

George L. Hammon, Berkeley, Calif.

Application November 8, 1937, Serial No. 173,347

2 Claims. (Cl. 158—27.4)

My invention relates to improvements in couplings for welding and cutting torches.

The practice in welding and cutting equipment such as that used with oxygen and fuel gases is to provide a handle into which the gases are led by suitable hose connections with separate storage tanks for each gas. This handle is provided with two longitudinally extending conduits controlled at the hose connecting end by means of individual valves and provided at the opposite end with separate chambers, usually annular, into which the conduits empty. The last mentioned end also is generally threaded on the outside to receive a clamping nut to hold in place on this end of the handle either the welding torch or the cutting attachment.

When in use it is the usual practice for welders to change from the welding torch to the cutting attachment and vice versa anywhere from six to ten times an hour, depending upon the type of work involved.

During the changeover, the metal mating surfaces of the couplings, one on the end of the handle and the other on the end of the cutting torch or welding tool, are exposed and subject to injury by denting, etc. After slight use it is difficult, if not impossible, to secure these parts together with a leak-tight fit, and particularly is this so with the cutting tool. Also, making the changeover has always required the use of a wrench,—a time consuming operation.

The operator using the cutting tool has one hand around the handle and usually over the joint at the coupling, for that is where the extra oxygen supply valve lever is located. Any leakage of gases at this point, in the case of a flareback or a spark thrown from the work, causes an instant flame resulting oftentimes in serious injuries to the hand of the operator.

It is therefore an object of my invention to provide an improved coupling member for use in attaching the cutting tool to the handle; to provide a coupling which is not easily injured when the parts are exposed and liable to be dropped and knocked about; to provide a coupling having at least one surface pliant enough to conform to any irregularities in the other surface; to provide a coupling member for attachment to the cutting tool and capable of use with handles long in service having a mutilated coupling face; to provide a coupling member with a plurality of conduits suitable for quick attachment to equipment now in use; to provide a coupling with which a tight, leak-proof joint can be effected merely by hand tightening of the clamping nut, thereby saving the time heretofore required when employing a wrench.

Other objects and advantages of my invention will appear from the following description taken in connection with the drawing in which:

Fig. 1 is a plan view partly in cross section of the welding handle and cutting tool coupled together, showing in dotted lines the operator's hand in usual operating position;

Fig. 2 is an enlarged cross-sectional view of a portion of the handle end and a similar form of coupling;

Fig. 3 is a view in perspective showing one of the coupling members detached from the cutting tool and from the handle; and Fig. 4 is a view substantially similar to Fig. 2 showing a modified form of the coupling.

The handle is generally designated by the numeral 10, and the cutting tool by the numeral 11. These parts are secured together by clamping nut 12. Hand tightening of nut 12 is sufficient when employing my invention.

Handle 10 is used both in the cutting operation and in the welding operation.

The welding attachment is secured to the end of handle 10 by a clamping nut similar to 12, but it is not illustrated as the coupling may be substantially identical with the one used on the cutting tool. However, the problem with the welding attachment is not as great as with the cutting tool. In welding the hand of the operator is not placed over the coupling nut 12 (see Fig. 1) so that there is not the chance of injury to the operator's hand. Nor does the welding tool have a separate shut-off valve 16 as does the cutting tool, which gives rise to considerable back pressure and chance for leakage at the coupling when using the cutting tool.

The cutting tool 11 is designed to provide two different types of discharge at its nozzle 13. The gases emitted from outer conduits 14 preheat the metal to be cut and when the operator observes that the metal has reached the correct temperature, handle 15 controlling valve 16 is depressed, resulting in a rapid emission of oxygen through center conduit 17. This extra supply of oxygen causes the burning out of the metal. When the cut is completed, the operator releases handle 15, closing valve 16 (shown in closed position in Fig. 1), with the result that there is considerable back pressure placed on the coupling between the cutting tool and the handle. This pressure, of course, remains until such time as valve 16 is again opened and the oxygen flows freely through conduit 17. When using the cutting tool, oxygen control valve 21 is opened all the way, throwing all the load on valve 16. Acetylene valve 22, however, is used to regulate the acetylene for the preheating flame. Thus, it is the presence in the cutting tool of valve 16 for the oxygen located beyond coupling 40 which accentuates the problem solved by the present invention. The problem is not a new one and has existed as long as this type of cutting tool has been in use.

As indicated, handle 10 is provided at one end with valves 21 and 22 connected respectively to the oxygen and acetylene or other fuel gas supply lines. These valves regulate the mixture of gases for the welding flame when the welding attachment is in place, and provide a shut off while the changeover is made from welding tool to cutting tool and vice versa.

Conduits 23, 24 conduct the gases to annular chamber 25 and a cylindrical chamber 26 concentric therewith here shown as part of the female coupling member. It is obvious that these parts could be made in the form of a male member if the designer preferred.

This coupling member on the end of handle 10 is generally designated by the numeral 27 and is threaded at 28 and 30 to receive the handle barrel 29 and clamping nut 12 respectively. Annular recess 26 preferably extends the full distance around the coupling face and communicates with acetylene conduit 24, through a series of interconnecting feed holes 31. Cylindrical chamber 25 is connected to oxygen conduit 23 and is shown in the center of coupling member 27 and separated from annular recess 26 by wall 32 having an inner tapered face 33. The outer wall 34 of coupling 27 has a tapered face 35 extending from annular chamber 26 to the end 36 of coupling 27. Faces 33 and 35 are preferably in alignment although this is not an essential characteristic so long as the other coupling member is made to correspond.

In the form shown, the cutting tool tapered coupling member, generally designated by the numeral 40, is shown separable from the main cutting tool at its threaded portion 41 to permit replacement. This coupling member has the central conduit 42 which opens into chamber 25 of the handle and has conduits 43 which open into annular groove 44 adapted to align with annular recess 26. Conduit 42 conducts the oxygen from the handle into the cutting tool at 50 from whence the oxygen is controlled by valve 16 actuated by handle 15.

For the purposes of the present invention it is not necessary to describe further the construction or operation of the cutting tool inasmuch as this may be varied in many of its details and still require the use of the present invention.

Conduit 42 and annular recess 44 in coupling 40 are separated by a partition or wall 51 having a tapered face 52; and by a walled annular recess 53 adapted to receive a resilient packing member 54. The latter member is held in place by flange 55, or if preferred it may be bonded to the recess when formed, or it may be cemented in place.

Annular recess 44 is also bounded by wall 60 having a tapered face 61. Adjacent wall 60 and extending in the opposite direction from recess 44 is another recess 62 adapted to receive a resilient packing member 63. Packing members 54 and 63 likewise have tapered faces which extend slightly beyond tapered faces 52 and 61. The latter faces are adapted to contact faces 33 and 35 on the female coupling member. The latter faces are also in intimate leak-tight contact with resilient packing members 54 and 63 with the result that there is no leakage of oxygen into the fuel gas chamber or vice versa, nor is there any leakage of one or both of these gases beyond bases 61 and 35 due to the seal effected by packing 63 against face 35. The resilient packings will effect a perfect seal regardless of any imperfections causing the adjacent metal faces not to seal.

Clamping nut 12 engages shoulder 65 on coupling 40 and when screwed onto handle coupling member 27, by hand pressure alone, secures a leak-tight joint. No wrench is needed in tightening nut 12, regardless of imperfections in the metal faces of the couplings.

The packing members 54 and 63 may be placed on the male member as in the construction just described or they may be placed in suitable recesses on the female member as shown in Fig. 4, a modification.

In Fig. 4 the acetylene conduits 31 empty into chamber 26 and the oxygen conduit empties into chamber 25. Cylindrical wall 32 separating conduits 31 and 26 has a tapered face 33 with an annular recess 70 to receive a resilient washer 71. Tapered face 35 extending from the end of the female coupling 27 to the edge of chamber 26 is also provided with a recess 72 to receive a resilient packing member 73. These packing members bear against tapered faces 74 and 75 on like coupling member 40. They, like packing members 54 and 63 may be loose washers which snap into the recess, or they may be bonded or cemented therein.

In the drawing the metallic meeting faces of the coupling members are shown separated for the purpose of clarity. Actually, it is preferred to have these faces, as well as the rubber faces, in contact.

Usually there is not a great deal of heat at the coupling so that rubber washers will give satisfactory service. In referring to rubber, I do so with the intention that the word is used to described a class of materials having the necessary qualities of resiliency, non-porosity, etc.

The two constructions described set forth the invention in its preferred form, but are not intended to limit it to these particular constructions except as required by the claims.

What I claim is:

1. In a welding and cutting torch, a coupling, comprising a male member, a female member, and a coupling nut threadably arranged to draw said male and female members together axially, said male and female members having inner and outer conduits disposed in registry, said inner and outer male member conduits being of different axial extent, annular shoulders terminally surrounding said male member inner conduit and having a washer receiving groove therebetween, a resilient annular washer disposed in said groove, said shoulders and washer defining a frustoconical surface; annular shoulders terminally surrounding said male member outer conduit and having a washer receiving groove therebetween, a resilient annular washer disposed in said groove, said washer and one of said annular shoulders defining a frustoconical surface; separated frustoconical receiving surfaces formed in said female member, each positioned to engage one of said resilient washers having a frustoconically defined shoulder associated therewith on said male member.

2. In combination with a welding and cutting torch, a coupling, comprising a male member, a female member, and a coupling nut arranged to draw said members axially together, said male and female members having inner gas conduits disposed in registry and having outer oxygen conduits disposed in registry, the terminal portions of said gas and oxygen conduits being axially separated; an annular shoulder formed on said male member adjacent said oxygen conduit terminal portion, an annular resilient sealing member disposed adjacent said shoulder and refining therewith a conical surface, and a second annular shoulder positioned adjacent said sealing member; an annular shoulder formed adjacent said gas conduit terminal portion, an annular resilient sealing member positioned adjacent said shoulder and defining therewith a conical surface, and a second annular shoulder formed adjacent said annular sealing member; a female member having separated frustoconical receiving surfaces formed therein, said surfaces being positioned to cooperate with said resilient sealing members and said annular shoulders to form metal to metal sealing contact adjacent said gas conduit terminal portions and to permit said resilient sealing members to flow into position separating the cooperating frustoconical surfaces from the oxygen conduit portions.

GEORGE L. HAMMON.